United States Patent [19]
Kazui et al.

[11] Patent Number: 5,642,174
[45] Date of Patent: Jun. 24, 1997

[54] SCENE CHANGE DETECTING DEVICE

[75] Inventors: Kimihiko Kazui; Eishi Morimatsu, both of Kawasaki, Japan

[73] Assignee: Fujitsu Limited, Japan

[21] Appl. No.: 697,250

[22] Filed: Aug. 21, 1996

[30] Foreign Application Priority Data

Mar. 21, 1996 [JP] Japan .................................. 8-063987

[51] Int. Cl.$^6$ ...................................... H04N 7/32
[52] U.S. Cl. ........................ 348/700; 348/699; 348/416; 348/415; 348/701; 386/4
[58] Field of Search ...................... 348/413, 416, 348/699, 700, 701, 722, 415, 423; 386/4; H04N 7/32, 7/12, 11/02, 11/04, 5/14, 9/64, 5/222, 9/74, 9/79, 9/87

[56] References Cited

U.S. PATENT DOCUMENTS

| | | | |
|---|---|---|---|
| 5,032,905 | 7/1991 | Koga | 358/105 |
| 5,099,322 | 3/1992 | Gove | 358/105 |
| 5,267,037 | 11/1993 | Sugiyama | 348/415 |
| 5,404,174 | 4/1995 | Sugahara | 348/700 |
| 5,436,664 | 7/1995 | Henry | 348/423 |
| 5,459,517 | 10/1995 | Kunitake et al. | 348/416 |
| 5,493,345 | 2/1996 | Ishikawa et al. | 348/700 |

FOREIGN PATENT DOCUMENTS 6-051315  2/1994  Japan .............................. H04N 7/137

*Primary Examiner*—Tommy P. Chin
*Assistant Examiner*—Nhon Thanh Diep
*Attorney, Agent, or Firm*—Staas & Halsey

[57] ABSTRACT

A scene change detecting device of a relatively small circuit scale is capable of accurately detecting a scene change using data which have already been compressed and coded. The scene change detecting device has an extracting circuit for extracting frame type information, frame identification information, and block type information from a coded signal of a moving picture which has been processed by block-adaptive interframe predictive coding. The block type information is sent to a counter, and the frame type information and the frame identification information are sent to a frame estimating circuit. Based on the block type information, the counter counts macroblocks with respect to each of the types of predictive processes over one frame. The frame estimating circuit estimates a frame immediately following a scene change based on the counted number of macroblocks with respect to each of the types of predictive processes, the frame type information, and the frame identification information.

7 Claims, 10 Drawing Sheets

|   | NATURE OF B1 | NATURE OF B2 | SCENE CHANGE FRAME |
|---|---|---|---|
| 1 | MANY P BLOCKS | MANY P BLOCKS | P3 |
| 2 | MANY B BLOCKS | MANY B BLOCKS | B1 |
| 3 | MANY P BLOCKS | MANY B BLOCKS | B2 |

FIG. 6

SCENE CHANGE DETECTING DEVICE

BACKGROUND OF THE INVENTION

(1) Field of the Invention

The present invention relates to a scene change detecting device for detecting the position of a frame where a scene changes in a moving picture, and more particularly to a scene change detecting device for detecting a scene change frame in a moving picture which has been processed by block-adaptive interframe predictive coding.

(2) Description of the Related Art

The recent development of multimedia technology has necessitated a new system for editing and searching for multimedia information. Particularly, it is important to edit and search for moving pictures efficiently because moving pictures contain much information among various forms of multimedia information. Editing and searching for a moving picture makes it indispensable to recognize each of the scenes which make up the moving picture. It has been customary to recognize the position of a scene change in a moving picture based on the fact that the correlation between a scene and a previous scene is greatly reduced in the first frame of the former scene.

Conventional scene change detecting processes are disclosed in Japanese laid-open patent publications Nos. 6-153146, 6-22298, and 6-259052, for example. According to these disclosed scene change detecting processes, a motion vector and discrete cosine transform (DCT) coefficients are calculated with respect to each of the pixels of a moving picture to detect a reduction in the correlation between scenes.

International standards such as ITU-T H.261, ISO/IEC MPEG-1, ISO/IEC MPEG-2, etc. are available for moving picture compressing and coding processes in order to achieve the storage and transmission of digital moving pictures which contain a vast amount of information. These moving picture compressing and coding processes process image information according to interframe predictive coding. One known apparatus for carrying out such a moving picture compressing and coding process detects a scene change as disclosed in Japanese laid-open patent publication No. 6-54315, for example. According to a disclosed scene change process, the standard deviation of image data in each 8×8 macroblock in a present frame is determined and compared with the standard deviation of image data of a similar macroblock in a previous frame. When the former standard deviation is smaller than the latter standard deviation, a coding mode for the macroblock in the present frame is set to an intrablock coding mode. When the former standard deviation is greater than the latter standard deviation, a coding mode for the macroblock in the present frame is set to a motion compensating mode. The number of macroblocks that enter the intrablock coding mode is counted. If the count is greater than half the number of macroblocks of one frame, then it is determined that scene change has occurred.

The scene change detecting processes disclosed in the former publications need a scene change detecting circuit which is inevitably large in scale because of calculations of a motion vector and discrete cosine transform (DCT) coefficients required with respect to each of the pixels of a moving picture.

The scene change detecting process disclosed in the latter publication requires a scene change detecting circuit smaller in scale than the scene change detecting circuit needed by the scene change detecting processes disclosed in the former publications because a scene change can be detected by monitoring a coding mode for each of the macroblocks. However, the scene change detecting circuit required by the scene change detecting process disclosed in the latter publication suffers limitations in that it functions only when information as to whether a coding mode is an intrablock coding mode or not is given from a compressing and coding device.

Inasmuch as digital moving pictures contain a very large amount of information, data which have already been compressed and coded will be provided and used more frequently for detecting scene changes. In order to operate the scene change detecting circuit required by the scene change detecting process disclosed in the latter publication, based on such data which have already been compressed and coded, it is necessary to decode those compressed and coded data. There has been a demand in the art for an apparatus capable of detecting a scene change by directly using data which have already been compressed and coded.

SUMMARY OF THE INVENTION

It is therefore an object of the present invention to provide a scene change detecting device which is of a relatively small circuit scale and is capable of detecting a scene change accurately using data which have already been compressed and coded.

To achieve the above object, there is provided in accordance with the present invention a scene change detecting device for detecting a scene-change frame of a moving picture which is processed by block-adaptive interframe predictive coding. The scene change detecting device comprises extracting means for extracting frame type information indicative of the type of a predictive process for frames, frame identification information identifying each frame, and block type information indicative of the type of a predictive process for each of macroblocks of frames, from a coded signal of a moving picture, counting means for counting macroblocks with respect to each of the types of predictive processes over one frame based on the block type information extracted by the extracting means, and frame estimating means for estimating a frame immediately following a scene change based on the number of macroblocks counted by the counting means with respect to each of the types of predictive processes, and the frame type information and the frame identification information which have been extracted by the extracting means.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6 is a diagram showing the relationship between the positions where a scene change occurs and the numbers of blocks in B frames;

DETAILED DESCRIPTION OF THE PREFERRED EMBODIMENT

The principles of a scene change detecting device according to the present invention will be described below with reference to FIG. 1.

Figure 1:
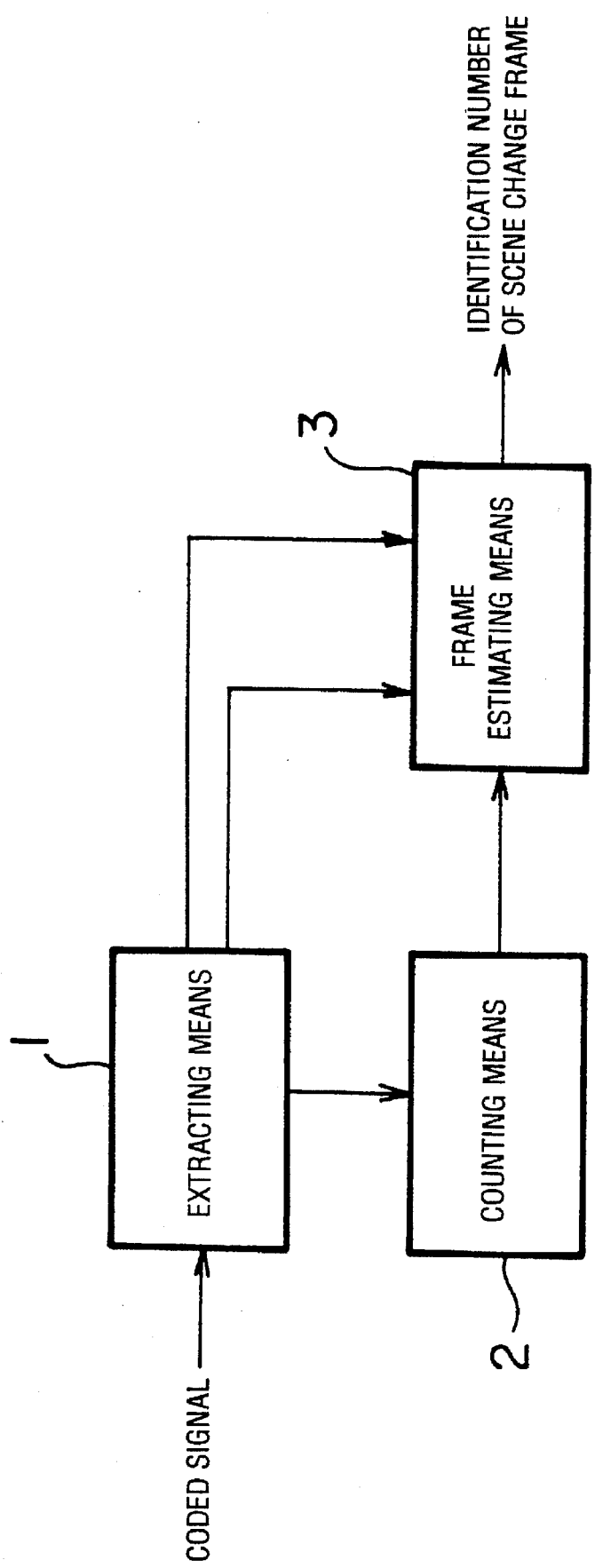
FIG. 1 is a block diagram illustrative of the principles of a scene change detecting device according to the present invention.

As shown in FIG. 1, the scene change detecting device generally comprises an extracting means 1 for extracting frame type information indicative of the type of a predictive process for frames, frame identification information identifying each frame, and block type information indicative of the type of a predictive process for each of macroblocks of frames, from a coded signal of a moving picture which has been processed by block-adaptive interframe predictive coding, a counting means 2 for counting macroblocks with respect to each of the types of predictive processes over one frame based on the block type information extracted by the extracting means 1, and a frame estimating means 3 for estimating a frame immediately following a scene change based on the number of macroblocks counted by the counting means 2 with respect to each of the types of predictive processes, and the frame type information and the frame identification information which have been extracted by the extracting means 1.

Specific details of the scene change detecting device will be described below with reference to FIGS. 2 and 3. The relationship between the scene change detecting device shown in FIG. 1 and the scene change detecting device shown in FIGS. 2 and 3 will be described later on after the scene change detecting device shown in FIGS. 2 and 3 will be described.

Figure 2:
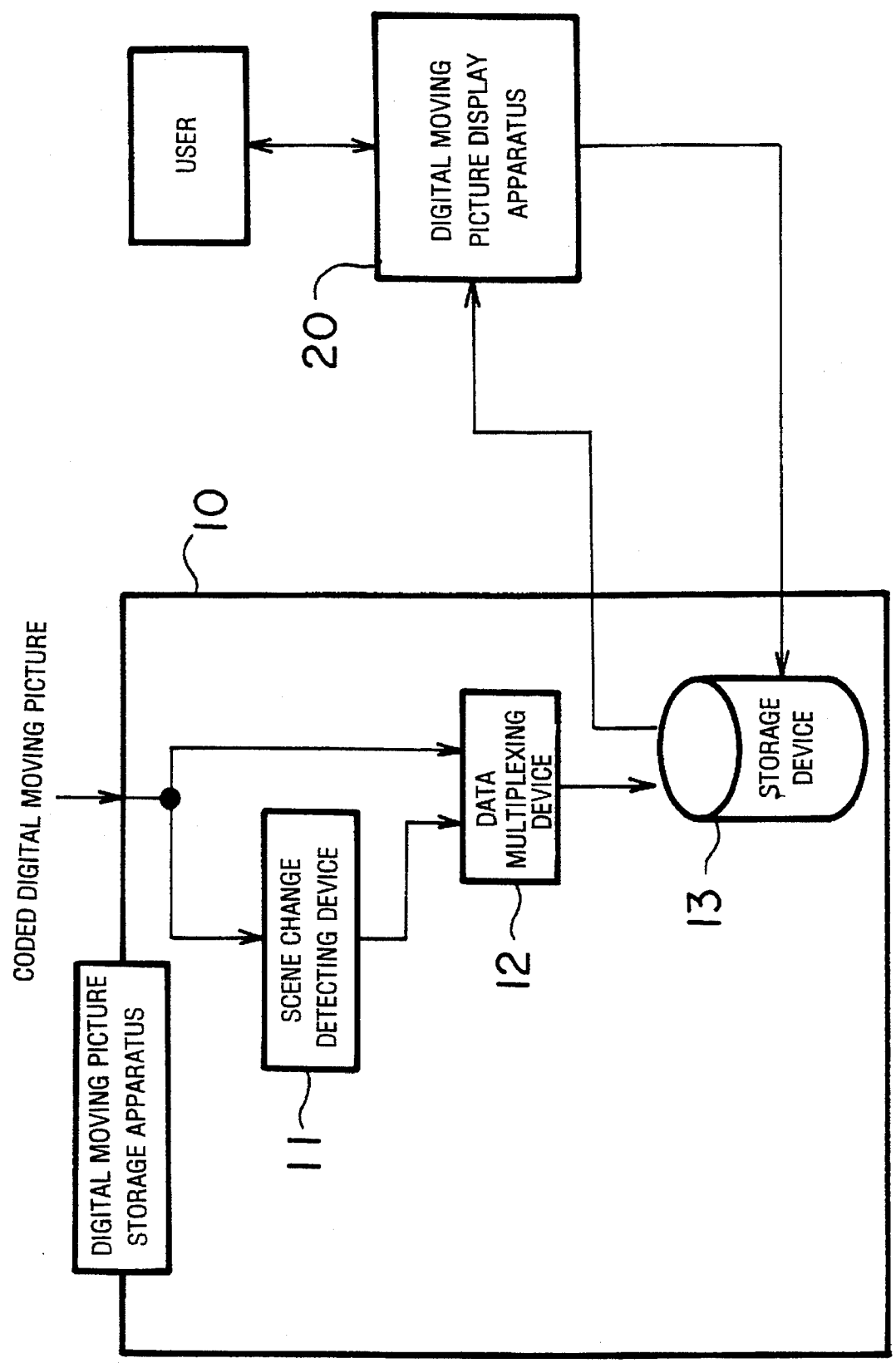
FIG. 2 is a block diagram of a digital moving picture storage apparatus which incorporates the scene change detecting device and a digital moving picture display apparatus.

FIG. 2 shows in block form a digital moving picture storage apparatus which incorporates the scene change detecting device and a digital moving picture display apparatus. The digital moving picture storage apparatus, designated by the reference numeral 10 in FIG. 2, is supplied with a coded signal of a moving picture which has been processed by block-adaptive interframe predictive coding from an external source such as a digital TV broadcasting station, a video-on-demand signal source, etc. The digital moving picture display apparatus, designated by the reference numeral 20 in FIG. 2, is connected to the digital moving picture storage apparatus 10.

The digital moving picture storage apparatus 10 comprises a scene change detecting device 11, a data multiplexing apparatus 12, and a storage device 13. The scene change detecting device 11 detects the position where a scene has changed based on the coded signal of the moving picture, and transmits scene information representing a start position and start image data of the scene to the data multiplexing apparatus 12. The data multiplexing apparatus 12 multiplexes the coded signal of the moving picture and the scene information, and stores the multiplexed data in the storage device 13.

The digital moving picture display apparatus 20 displays a list of start images of respective scenes based on the data read from the storage device 13. When the user who edit and searches for images points to either one of these scenes, the digital moving picture display apparatus 20 reproduces and displays the indicated scene as a moving picture.

Figure 3:
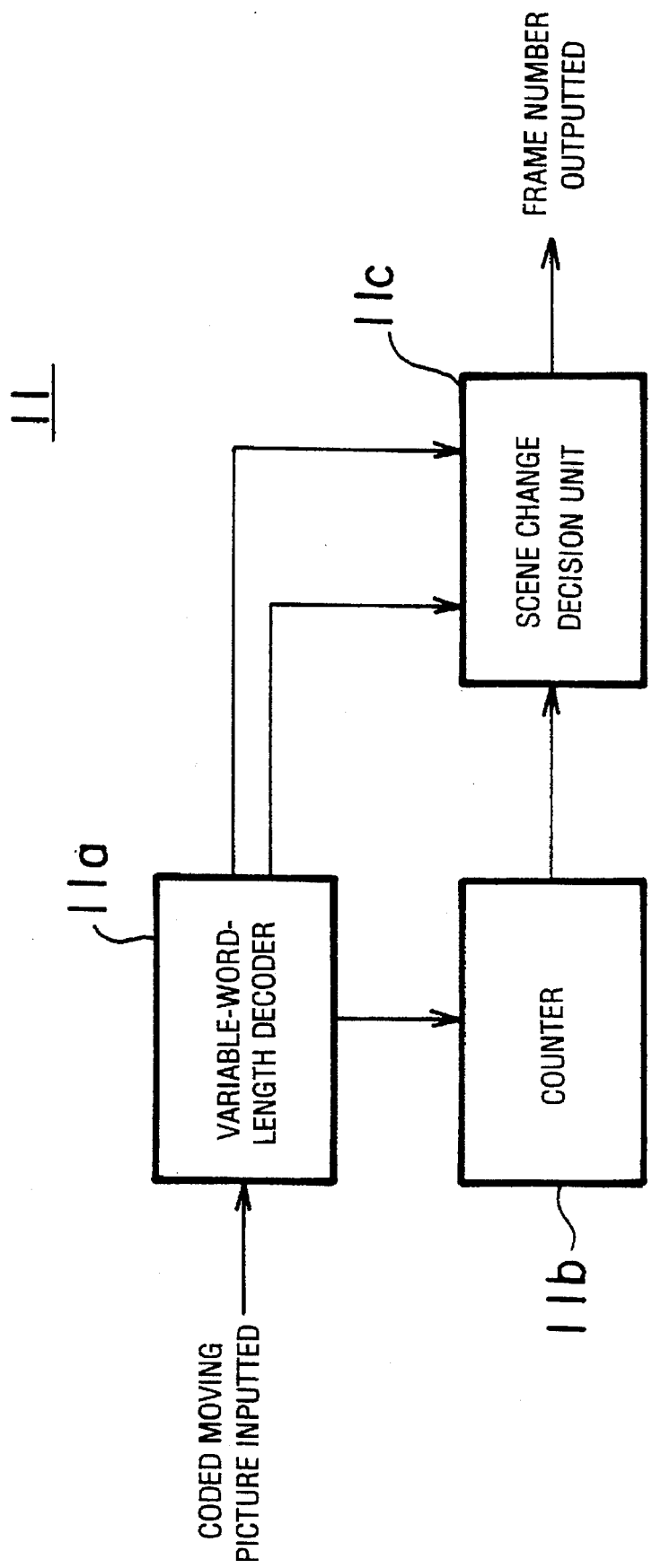
FIG. 3 is a block diagram of the scene change detecting device shown in FIG. 2.
Figure 4:
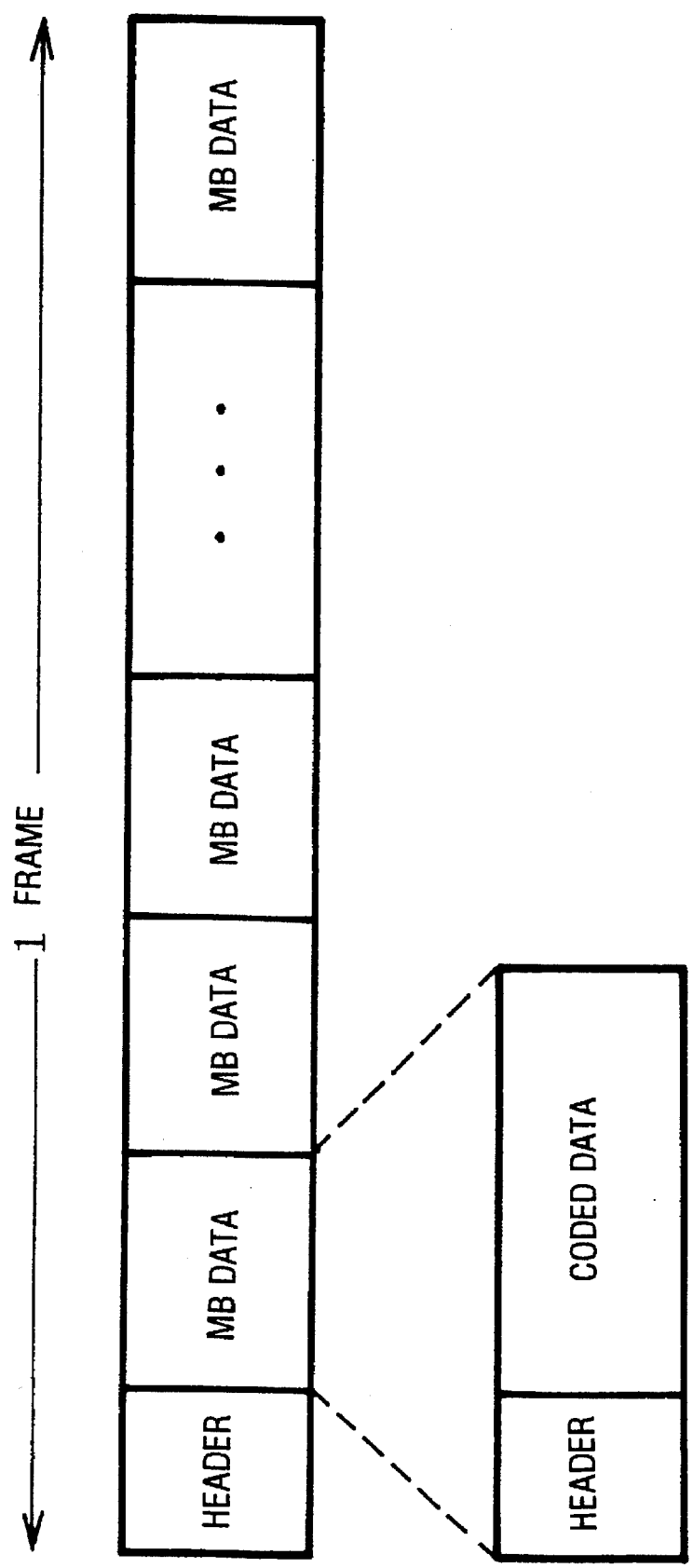
FIG. 4 is a diagram of a frame of a coded signal of a moving picture.

FIG. 3 shows the scene change detecting device 11 in detail. The scene change detecting device 11 has a variable-word-length decoder 11a which is supplied with the coded signal of the moving picture which has been processed by block-adaptive interframe predictive coding. The moving picture comprises 30 frames per unit time, for example, and each of the frames comprises a 8×8 macroblock. The coded signal of the moving picture has a frame structure as shown in FIG. 4. One frame of the coded signal has storage areas for 64 (=8×8) macroblock data, and each of the storage areas has a header which contains a frame number indicative of the frame and frame type information indicative of the type of a predictive process for the frame. The frame type information represents whether the frame is a frame that has been coded according to an intraframe predictive process (hereinafter referred to as an "I frame"), a frame that has been coded according to a forward interframe predictive process (hereinafter referred to as a "P frame"), or a frame that has been coded according to a bidirectional interframe predictive process (hereinafter referred to as a "B frame").

Each of the storage areas for the macroblock data is divided into a data storage region and a header storage region. The data storage region stores the coded data of a corresponding macroblock, and the header storage region stores the block type information indicative of the type of a predictive process for a corresponding macroblock. The block type information represents whether the macroblock is a macroblock that has been coded according to an intraframe predictive process (hereinafter referred to as an "I block"), a macroblock that has been coded according to a forward interframe predictive process (hereinafter referred to as a "P block"), a macroblock that has been coded according to a backward interframe predictive process (hereinafter referred to as a "B block"), or a macroblock that has been coded according to a bidirectional interframe predictive process (hereinafter referred to as a "Bi block").

Referring back to FIG. 3, the variable-word-length decoder 11a extracts a frame number, frame type information, and block type information from the delivered coded signal, transmits the frame number and the frame type information to a scene change decision unit 11c, and transmits the block type information to a counter 11b. The counter 11b counts macroblocks with respect to each of the types of predictive processes over one frame. Specifically, the counter 11b counts macroblocks which are I blocks, macroblocks which are P blocks, macroblocks which are B blocks, and macroblocks which are Bi blocks, among the 64 macroblocks of one frame, and sends the counts to the scene change decision unit 11c. The counted numbers of macroblocks with respect to the respective types of predictive processes over one frame reflect the correlation between the frames of the moving picture. Based on this principle, the scene change decision unit 11c determines a scene change from the numbers of macroblocks with respect to the respective types of predictive processes, the frame number, and the frame type information, and outputs a frame number immediately after the scene change. Detailed operation of the scene change decision unit 11c will be described later on with reference to FIGS. 5(A), 5(B) through 8.

The extracting means 1 shown in FIG. 1 corresponds to the variable-word-length decoder 11a shown in FIG. 3, the counting means 2 shown in FIG. 1 to the counter 11b shown in FIG. 3, and the frame estimating means 3 shown in FIG. 1 to the scene change decision unit 11c shown in FIG. 3.

Prior to describing detailed operation of the scene change decision unit 11c, the block-adaptive interframe predictive coding process will be described below with reference to FIGS. 5(A) and 5(B).

Figure 5A:
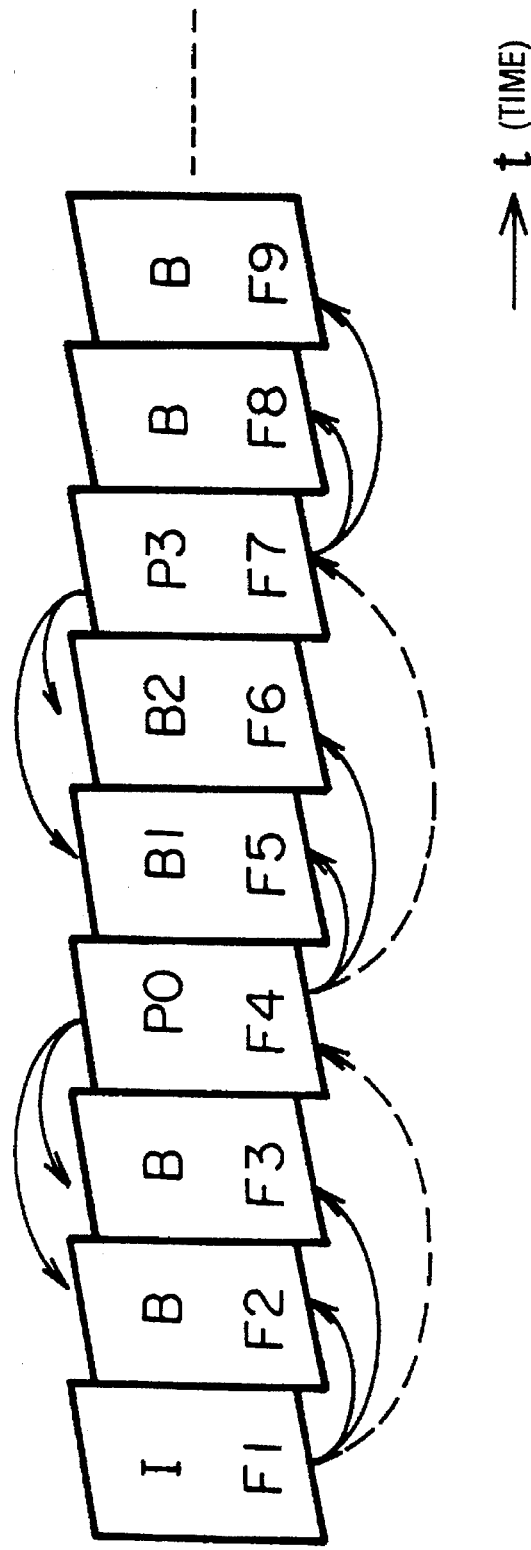
FIG. 5(A) is a diagram of frames of a moving picture which are inputted to a coding device.
Figure 5B:
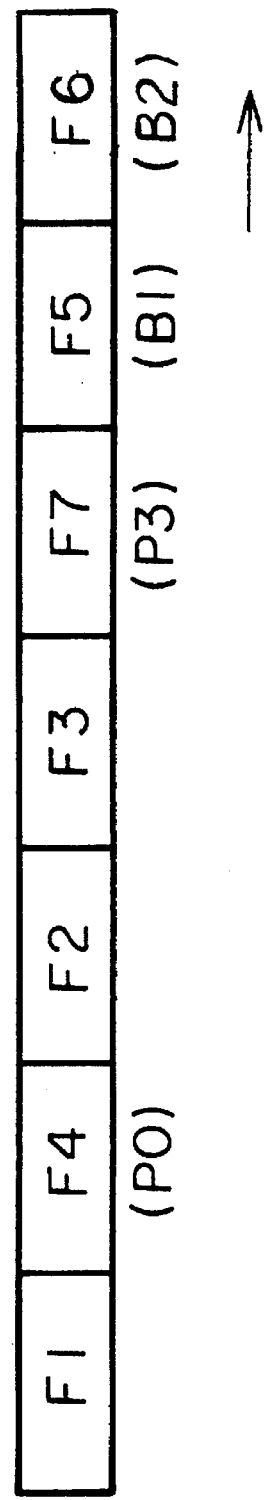
FIG. 5(B) is a diagram of a sequence of frames which have been coded.

FIG. 5(A) shows frames of a moving picture which are inputted to a coding device (not shown), and FIG. 5(B) shows a sequence of frames which have been coded. As shown in FIG. 5(A), an image to be coded along the time axis comprises frames F1, F2, F3, . . . , F9. When these frames F1, F2, F3, . . . , F9 are coded by interframe predictive coding, they become I, B, B, P, B, B, P, B, B frames, respectively. An I frame is predictively coded within itself, and each of the macroblocks in the I frame becomes an I block. A P frame is predictively coded using an I frame or a P frame which is positioned ahead of the frame in the sequence prior to the coding process, and each of the macroblocks in the P frame becomes either an I block or a P block. A B frame is predictively coded using both an I frame or a P frame which is positioned ahead of the frame in the sequence prior to the coding process and an I frame or a P frame which is positioned behind the frame in the sequence prior to the coding process, and each of the macroblocks in the B frame becomes either an I block, a P block, a B block, or a Bi block. Each of the macroblocks in the P and B frames is coded by a predictive coding process which generates a minimum amount of information. The amount of information which is generated is progressively smaller in the order of I, P, B, B, Bi blocks.

As shown in FIG. 5(A), a B frame is coded on the basis of an I frame or a P frame which is positioned ahead of the B frame in the sequence, and an I frame or a P frame (a P frame in the illustrated example) which is positioned behind the B frame in the sequence. Since an I frame or a P frame which is positioned behind the B frame in the sequence is used, it is necessary to code, at first, such an I frame or a P frame which is positioned behind the B frame in the sequence. Therefore, as shown in FIG. 5(B), the frames are coded in the order of frames F1, F4, F2, F3, F7, F5, F6, . . . . The coded frames are then sent in the order named to the variable-word-length decoder 11a (FIG. 3).

Figure 7:
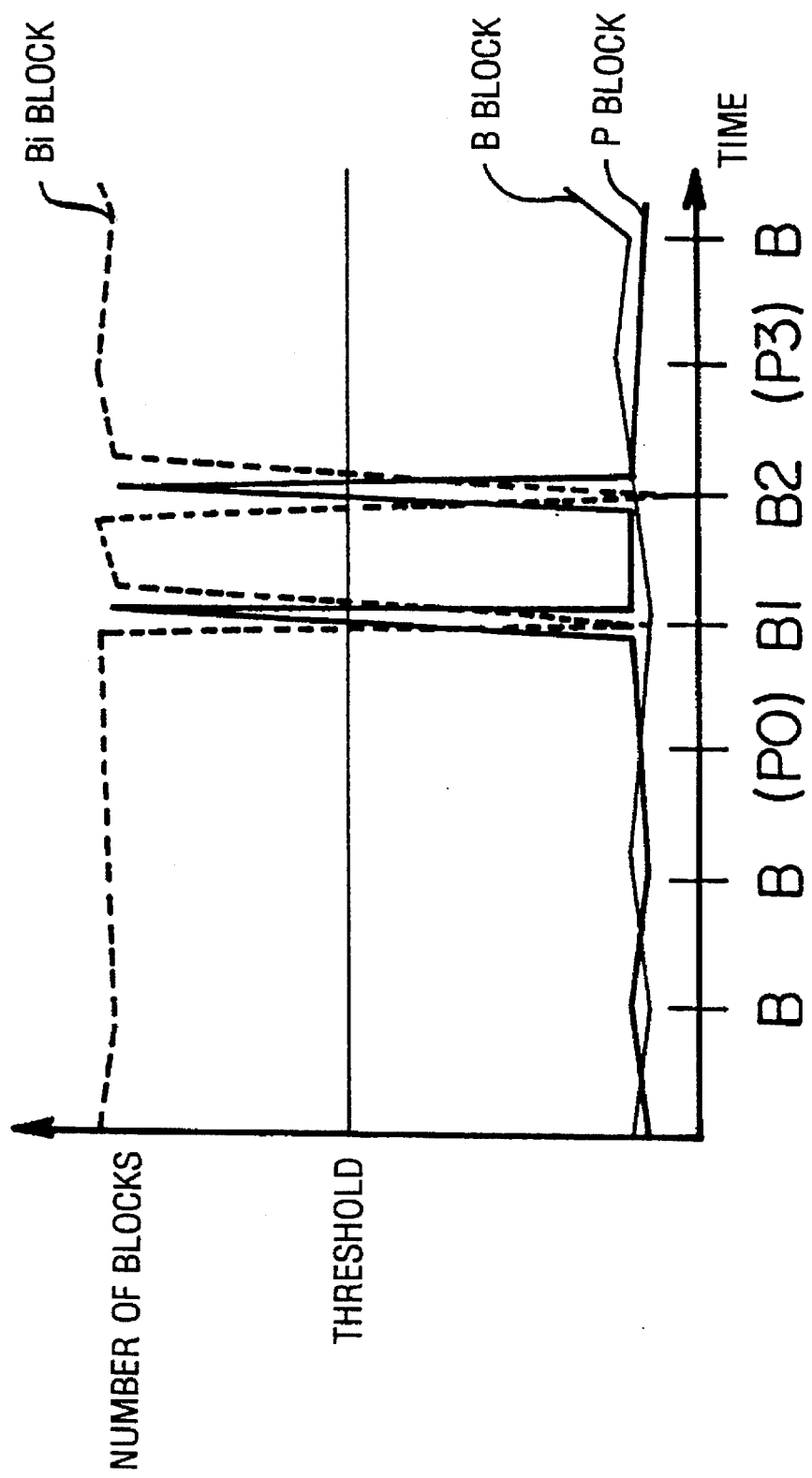
FIG. 7 is a diagram showing how the number of blocks in frames B1, B2 changes in the sequence in which frames to be coded are inputted, at the time a scene change occurs between frames B2, P3.

In FIG. 5(A), the frames F4, F5, F6, F7 in particular are referred to as frames P0, B1, B2, P3. If a scene change occurs between these frames, then the number of macroblocks changes as follows:

First, if a scene change occurs between the frames B2, P3, then the frames B1, B2 have a low correlation to the frame P3, and are predictively coded mainly on the basis of the frame P0. If there is no such scene change and hence the frames B1, B2 have a high correlation to the frame P3, then the number of Bi blocks which have a minimum amount of generated information is large in the frames B1, B2. If such a scene change occurs, the macroblocks of the frames B1, B2 are predictively coded mainly according to the forward interframe predictive process, and the number of P blocks is large in the frames B1, B2. FIG. 7 shows how the number of blocks in the frames B1, B2 changes in the sequence in which the frames to be coded are inputted, if a scene change occurs between the frames B2, P3.

If a scene change occurs between the frames P0, B1, then the frames B1, B2 have a low correlation to the frame P0, and are predictively coded mainly on the basis of the frame P3. If there is no such scene change and hence the frames B1, B2 have a high correlation to the frame P0, then the number of Bi blocks which have a minimum amount of generated information is large in the frames B1, B2. If such a scene change occurs, the macroblocks of the frames B1, B2 are predictively coded mainly according to the backward interframe predictive process, and the number of B blocks is large in the frames B1, B2.

If a scene change occurs between the frames B1, B2, then the frame B1 has a low correlation to the frame P3, and is predictively coded mainly on the basis of the frame P0, and the frame B2 has a low correlation to the frame P0, and is predictively coded mainly on the basis of the frame P3. If there is no such scene change, then the number of Bi blocks which have a minimum amount of generated information is large in the frames B1, B2. If such a scene change occurs, the macroblocks of the frame B1 are predictively coded mainly according to the forward interframe predictive process, and the number of P blocks is large in the frame B1, and the macroblocks of the frame B2 are predictively coded mainly according to the backward interframe predictive process, and the number of B blocks is large in the frame B2.

The above three cases of scene changes are illustrated in FIG. 6. The column "SCENE CHANGE FRAME" in FIG. 6 indicates frames which immediately follow the scene changes that occur in the above three cases.

The scene change decision unit 11c (see FIG. 3) monitors when a B frame is inputted. When a B frame is inputted, the scene change decision unit 11c recognizes the numbers of P blocks and B blocks out of the macroblocks of the B frame, based on the counts transmitted from the counter 11b. The scene change decision unit 11c then compares the counts with respective thresholds to confirm which count is greater, and compares the confirmed result with the data shown in FIG. 6 to estimate the position where a scene change has occurred. The scene change decision unit 11c outputs a frame number immediately following the estimated position where a scene change has occurred.

In the example shown in FIG. 5(A), two frames, i.e., the frames B1, B2, are present between the frame P0, P3. However, three or more B frames may be present between adjacent P frames or possibly between I and P frames. In such an instance, the scene change decision unit 11c monitors when a B frame is inputted. When a B frame is inputted, the scene change decision unit 11c recognizes the numbers of P blocks and B blocks out of the macroblocks of the B frame, based on the counts transmitted from the counter 11b. The scene change decision unit 11c then compares the counts with respective thresholds to confirm which count is greater. Based on the confirmed result, when the number of P blocks is greater than the threshold in either one of the B frames as is the case with the first row shown in FIG. 6, the scene change decision unit 11c estimates an I frame or a P frame immediately following the B frames in the sequence to be a frame which immediately follows a scene change.

When the number of B blocks is greater than the threshold in either one of the B frames as is the case with the second row shown in FIG. 6, the scene change decision unit 11c estimates the foremost one of the B frames in the sequence to be a frame which immediately follows a scene change.

When the number of P blocks is greater than the threshold in a first group of former frames in the sequence of the B frames, and the number of B blocks is greater than the threshold in a second group of remaining latter frames in the sequence of the B frames, as is the case with the third row shown in FIG. 6, the scene change decision unit 11c estimates the foremost frame in the sequence of the second group of remaining latter frames to be a frame which immediately follows a scene change.

Figure 8:
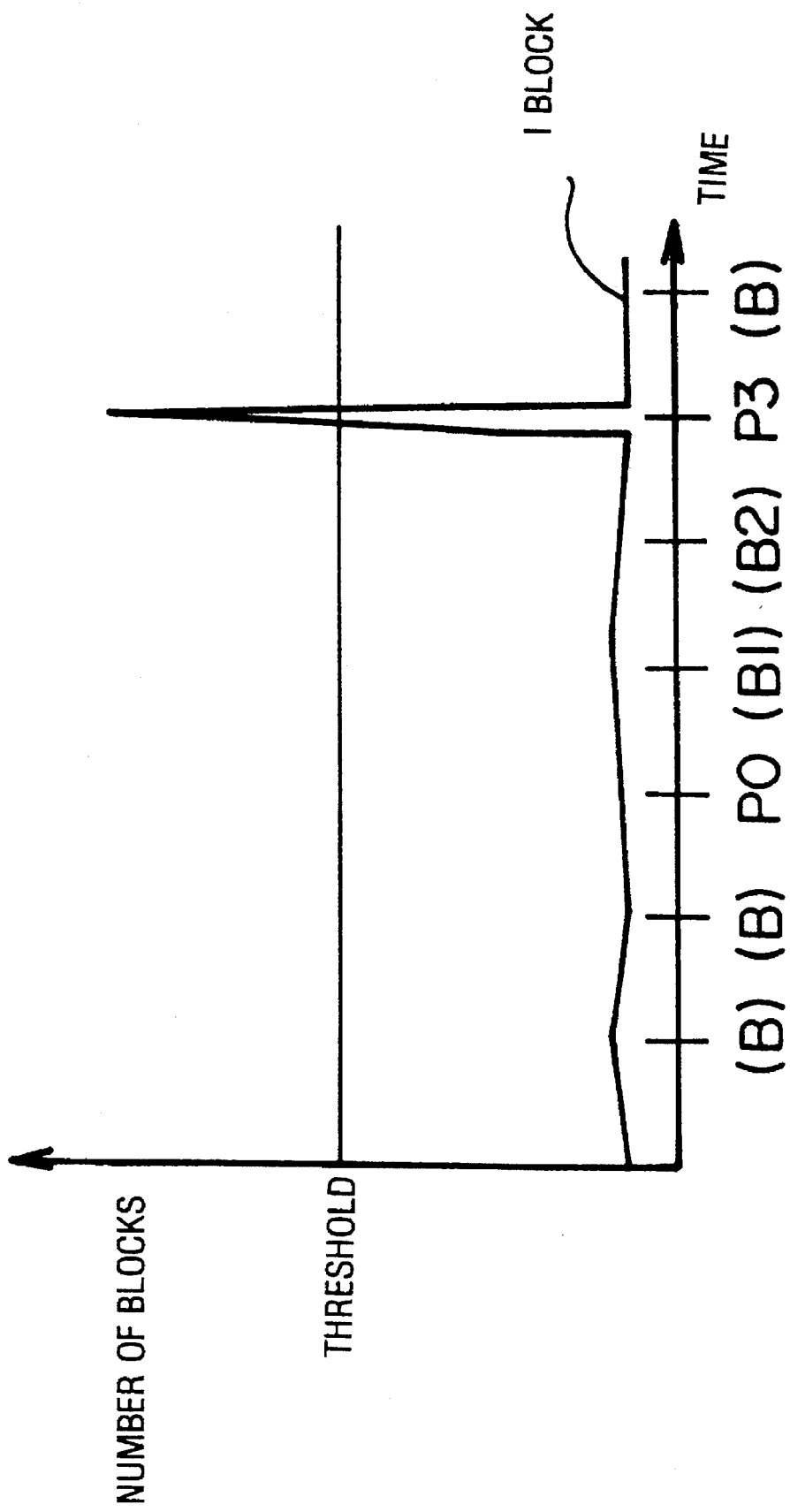
FIG. 8 is a diagram showing how the number of I blocks in P frames changes in the sequence in which frames to be coded are inputted, at the time a scene change occurs ahead of a frame P3.

As shown in FIG. 8, in the absence of a scene change, the number of P blocks is large and the number of I blocks is small in a P frame. If a scene change occurs before a P frame, then the number of I blocks increases. Therefore, the scene change decision unit 11c may monitor when a P frame is inputted, and may confirm when the number of I blocks out of the macroblocks of the P frame exceeds a threshold to detect the occurrence of a scene change. However, even if the number of I blocks increases in a frame P3 shown in FIG. 8, it is only possible to spot a scene change as being located between the frame P0 and the frame P3, but not to identify a detailed location of such a scene change.

The above process of monitoring a P frame is capable of detecting a scene change more quickly and requires a smaller amount of calculations than the process of monitoring a B frame.

If three or more B frames are present between adjacent P frames or possibly between I and P frames in the process of monitoring a P frame, then the scene change decision unit 11c operates as follows:

The scene change decision unit 11c monitors when a P frame is inputted, and checks the number of I blocks out of the macroblocks of the P frame when the P frame is inputted. When the number of I blocks exceeds the threshold, the scene change decision unit 11c estimates either one of the frame P and the B frames to be a frame which immediately follows a scene change.

The process of monitoring a P frame and the process of monitoring a B frame may be combined with each other.

Figure 9:
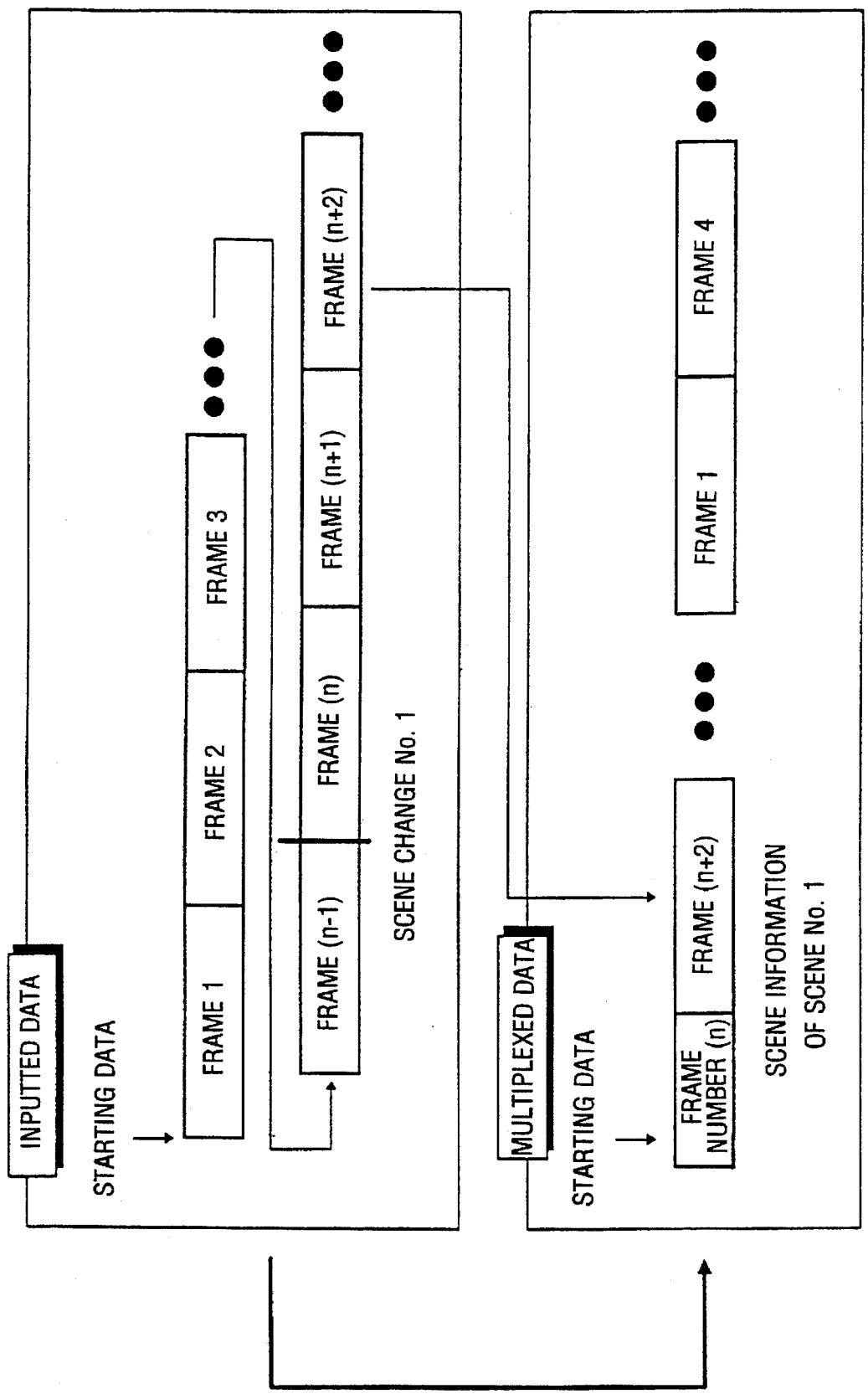
FIG. 9 is a diagram illustrative of a specific multiplexing process carried out by a data multiplexing apparatus.

FIG. 9 illustrates a specific multiplexing process carried out by the data multiplexing apparatus 12 shown in FIG. 2. In FIG. 9, "INPUTTED DATA" comprise frames of a coded signal which are arranged in a sequence prior to their being coded for the purpose of illustration. These frames include a frame (n−1) which is a P frame, a frame (n) and a frame (n+1) which are B frames, and a frame (n+2) which is a I frame, and a scene change No. 1 occurs between the frames (n−1) and the frame (n). "MULTIPLEXED DATA" comprise the frames of the coded signal, an inputted frame number (n) immediately following the scene change, and a first coded signal frame (n+2) of a scene, the inputted frame number (n) and the first coded signal frame (n+2) being positioned prior to the frames of the coded signal. Similarly, scene information of another scene change is added prior to frames of a coded signal.

Figure 10:
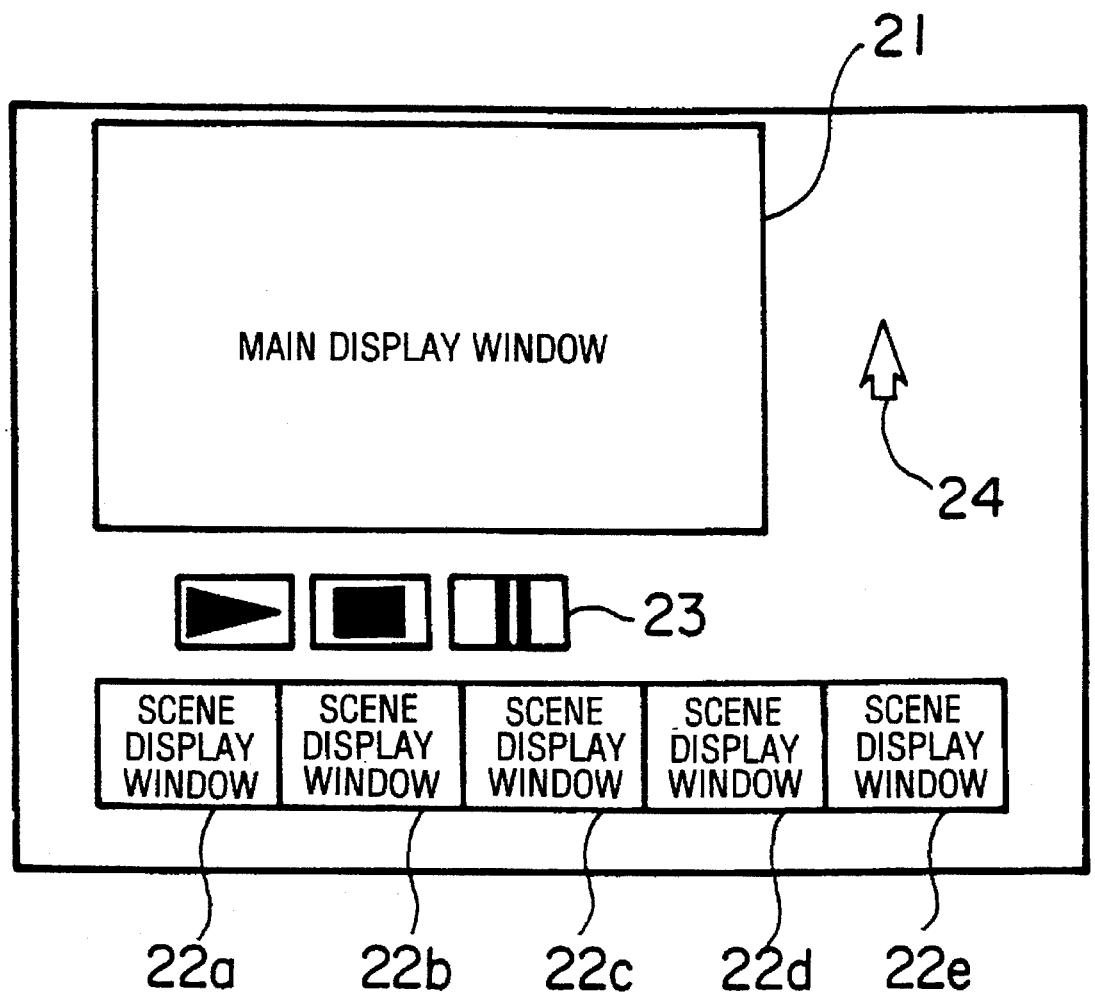
FIG. 10 is a view of a displayed screen image of a digital moving picture display apparatus.

FIG. 10 shows a displayed screen image of the digital moving picture display apparatus 20 shown in FIG. 2. As shown in FIG. 10, the displayed screen image includes a main display window 21 for displaying a moving picture and a plurality of scene display windows 22a–22e for displaying first still images of scenes. When either one of the scene display windows 22a–22e is selected and clicked by a cursor 24, the main display window 21 displays a first still image of the moving picture of the selected scene. The moving picture of the selected scene can be displayed on the main display window 21 by control buttons 23 which can selectively be clicked by the cursor 24.

With the arrangement of the present invention, as described above, block type information indicative of the type of a predictive process for each of macroblocks of frames is extracted from a coded signal of a moving picture which has been processed by block-adaptive interframe predictive coding, and the number of macroblocks with respect to each of the types of predictive processes is counted over one frame. A frame immediately following a scene change is estimated on the basis of the counted number of macroblocks with respect to each of the types of predictive processes.

The scene change detecting device according to the present invention requires a relatively small-scale circuit because it does not need to process each pixel of a moving picture. The scene change detecting device is capable of accurately detecting a scene change by directly using compressed and coded data without having to decoding the compressed and coded data.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A scene change detecting device for detecting a scene-change frame of a moving picture which is processed by block-adaptive interframe predictive coding, comprising:

extracting means for extracting frame type information indicative of the type of a predictive process for frames, frame identification information identifying each frame, and block type information indicative of the type of a predictive process for each of macroblocks of frames, from a coded signal of a moving picture;

counting means for counting macroblocks with respect to each of the types of predictive processes over one frame based on the block type information extracted by said extracting means; and frame estimating means for estimating a frame immediately following a scene change based on the number of macroblocks counted by said counting means with respect to each of the types of predictive processes, and the frame type information and the frame identification information which have been extracted by said extracting means.

2. A scene change detecting device according to claim 1, wherein said frame type information comprises information indicating whether each of the frames is coded by an intraframe predictive process, a forward interframe predictive process, or a bidirectional interframe predictive process.

3. A scene change detecting device according to claim 1, wherein said block type information comprises information indicating whether each of the macroblocks is coded by an intraframe predictive process, a forward interframe predictive process, a backward interframe predictive process, or a bidirectional interframe predictive process.

4. A scene change detecting device according to claim 1, wherein when the number of macroblocks coded by a forward interframe predictive process is greater than a predetermined value in a plurality of frames coded by a bidirectional interframe predictive process which are successive in a sequence prior to being coded, said frame estimating means comprises estimates a frame coded by an intraframe predictive process or the forward interframe predictive process, which immediately follows said plurality of frames in the sequence, to be a frame immediately following a scene change.

5. A scene change detecting device according to claim 1, wherein when the number of macroblocks coded by a backward interframe predictive process is greater than a predetermined value in a plurality of frames coded by a bidirectional interframe predictive process which are successive in a sequence prior to being coded, said frame estimating means estimates a foremost one of said plurality of frames in the sequence, to be a frame immediately following a scene change.

6. A scene change detecting device according to claim 1, wherein when the number of macroblocks coded by a forward interframe predictive process is greater than a predetermined value in a first group of former frames of a plurality of frames coded by a bidirectional interframe predictive process which are successive in a sequence prior to being coded, and when the number of macroblocks coded by a backward interframe predictive process is greater than a predetermined value in a second group of remaining latter frames of said plurality of frames, said frame estimating means estimates a foremost one of said second group of remaining latter frames in the sequence, to be a frame immediately following a scene change.

7. A scene change detecting device according to claim 1, wherein when the number of macroblocks coded by an intraframe predictive process is greater than a predetermined value in a frame coded by a forward interframe predictive process, said frame estimating means estimates either one of said frame coded by the forward interframe predictive process and a plurality of frames coded by a bidirectional interframe predictive process which are sandwiched between said frame coded by the forward interframe predictive process and a frame coded by the intraframe predictive process or the forward interframe predictive process which immediately precedes the frame coded by the forward interframe predictive process in a sequence prior to being coded, to be a frame immediately following a scene change.

* * * * *